H. J. CHILDS.
Coffee-Pots.
No. 136,703.    Patented March 11, 1873.
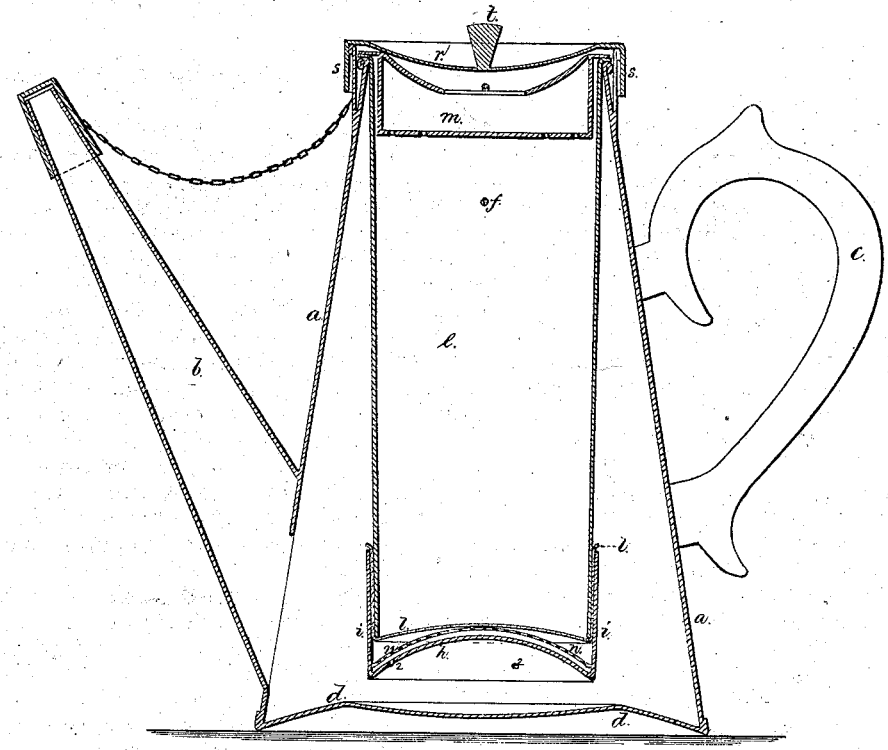
Witnesses,
Chas. H. Smith
Geo. D. Walker
Inventor
Henry J. Childs
by
Lemuel W. Serrell
atty.

UNITED STATES PATENT OFFICE

HENRY J. CHILDS, OF NEW YORK, N. Y.

IMPROVEMENT IN COFFEE-POTS.

Specification forming part of Letters Patent No. 136,703, dated March 11, 1873.

*To all whom it may concern:*

Be it known that I, HENRY J. CHILDS, of the city and State of New York, have invented an Improvement in Pots for Coffee, &c., of which the following is a specification.

In this coffee-pot the lid or cover is concave, so that the central portion is lowest, and thereby the central knob or handle is protected, and at the same time the condensation that takes place on the under side of the cover drops from the central portion thereof, instead of running to the outer edge; hence the rim of the lid can surround the upper end of the pot, instead of being within the same, as heretofore usual. The coffee, or material to be extracted, is introduced within a cylinder, with a movable convex strainer and retaining perforated diaphragm at the bottom, by means of which the hot water is retained in contact with the coffee, and passes gradually into the pot, and the grounds and deleterious substances are retained in the cylinder.

In the drawing this improvement is illustrated by a vertical section of the pot.

The conical sides $a$, spout $b$, and handle $c$ are of any usual size or character. I prefer to make the bottom $d$ concave, with a downward convexity in the middle, as shown. The cylinder $e$ has a flange around its upper end that rests upon an offset within the upper end of the pot. This cylinder may be lifted out for cleaning, the cross-wire $f$ being provided for that purpose. The diaphragm $h$ is perforated with a few holes, 2, of the proper size for allowing the liquid extract to run from the cylinder $e$ into the pot. Surrounding the diaphragm $h$ is the rim or band $i$ that confines the flannel or paper strainer $l$ to the bottom of the cylinder $e$. Within the rim $i$, and above the diaphragm $h$, is a strainer of perforated material at $n$. This construction prevents the coffee-grounds passing into the pot, and detains the liquid in contact with the coffee long enough to insure the extraction of the soluble matter. There is a sprinkler made of the perforated cap $m$, into which the hot water is poured. This sprinkler is removable, and its flange rests upon the upper end of the said cylinder $e$. The cover is made with a concave top plate, $r$, and rim $s$, of a size sufficiently large to surround the top of the pot. The knob or handle $t$ is within the concavity of the top plate $r$, and any condensation upon the under side of the cover runs to the middle and drops, so that the exterior of the coffee-pot will not be soiled by drippings from the edge of the rim $s$. Two of the cylinders $e$ and strainers may be used instead of one, in which case rings or other suitable means will be employed in lifting the outer cylinder, instead of the bar $f$.

I claim as my invention—

The cylinder $e$, hanging within the coffee-pot from the flange at its upper end, in combination with the convex diaphragm $h$, rim $i$, and strainers $l$ and $n$, as and for the purposes set forth.

Signed by me this 15th day of January, 1873.

HENRY J. CHILDS.

Witnesses:
GEO. T. PINCKNEY,
CHAS. H. SMITH.